US010989125B2

(12) United States Patent
Kido et al.

(10) Patent No.: US 10,989,125 B2
(45) Date of Patent: Apr. 27, 2021

(54) CONTROLLER FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota (JP)

(72) Inventors: Eiichiro Kido, Okazaki (JP); Masanao Idogawa, Toyota (JP); Manami Yasunaga, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 60 days.

(21) Appl. No.: 16/177,966

(22) Filed: Nov. 1, 2018

(65) Prior Publication Data

US 2019/0136773 A1 May 9, 2019

(30) Foreign Application Priority Data

Nov. 8, 2017 (JP) ............................ JP2017-215923

(51) Int. Cl.

| | |
|---|---|
| ***F02D 41/00*** | (2006.01) |
| ***F02D 41/14*** | (2006.01) |
| ***F02P 5/15*** | (2006.01) |
| ***F02P 5/04*** | (2006.01) |
| ***F02D 37/02*** | (2006.01) |

(Continued)

(52) U.S. Cl.

CPC ........... *F02D 41/008* (2013.01); *F02D 37/02* (2013.01); *F02D 41/1408* (2013.01); *F02D 41/1454* (2013.01); *F02P 5/045* (2013.01); *F02P 5/1512* (2013.01); *F02D 41/40* (2013.01);

(Continued)

(58) Field of Classification Search

CPC .... F02D 41/008; F02D 37/02; F02D 41/1408; F02D 41/1454; F02D 2200/1015; F02D 2250/18; F02D 41/40; F02D 2041/389; F02D 41/0082; F02D 41/0085; F02D 41/0235; F02D 41/024; F02D 41/0245;

(Continued)

(56) References Cited

U.S. PATENT DOCUMENTS 4,051,816 A * 10/1977 Masaki .................. F02D 41/36 123/443
4,697,561 A * 10/1987 Citron ................ G01M 15/046 123/339.14

(Continued)

FOREIGN PATENT DOCUMENTS

CN 1202219 A 12/1998
JP 06137242 A * 5/1994

(Continued)

*Primary Examiner* — Sizo B Vilakazi
*Assistant Examiner* — Brian R Kirby
(74) *Attorney, Agent, or Firm* — Finnegan, Henderson, Farabow, Garrett & Dunner, LLP

(57) ABSTRACT

A controller for an internal combustion engine includes processing circuitry. The processing circuitry performs a dither control process. The dither control process includes a first mode in which a cylinder serving as a rich combustion cylinder is sequentially changed and a second mode in which a specified cylinder is fixed as one of a rich combustion cylinder and a lean combustion cylinder. The processing circuitry selects the first mode or the second mode based on an operating point of the internal combustion engine.

4 Claims, 5 Drawing Sheets

(51) Int. Cl.
*F02D 41/40* (2006.01)
*F02D 41/38* (2006.01)

(52) U.S. Cl.
CPC .................. *F02D 2041/389* (2013.01); *F02D 2200/1015* (2013.01); *F02D 2250/18* (2013.01)

(58) Field of Classification Search
CPC .. F02D 41/025; F02D 41/0255; F02P 5/1512; F02P 5/045; F02P 5/1522
USPC ........ 123/305, 491, 691, 692; 701/103, 111; 60/274, 284, 285
See application file for complete search history.

(56) References Cited

U.S. PATENT DOCUMENTS 5,168,853 A * 12/1992 Kittelson ................ F02D 37/02 123/406.23
5,211,011 A * 5/1993 Nishikawa .......... F02D 41/0255 60/284
5,279,114 A * 1/1994 Kurita ................... F01N 11/007 60/276
5,461,857 A * 10/1995 Itou ........................... F01N 3/22 60/276
5,661,971 A * 9/1997 Waschatz .............. F02D 41/024 60/274
5,758,493 A * 6/1998 Asik ................... F02D 41/0082 60/274
5,845,492 A * 12/1998 Isobe ..................... F02M 26/71 60/284
5,974,793 A * 11/1999 Kinugasa .............. F01N 3/0842 60/285
6,311,482 B1 * 11/2001 Yamashita ............ F01N 3/0842 60/285
6,318,075 B1 * 11/2001 Gunther ................ F01N 3/0842 60/285
6,324,835 B1 * 12/2001 Surnilla ................ F02D 41/024 60/274
6,345,496 B1 * 2/2002 Fuwa ................. B01D 53/9454 60/274
6,651,422 B1 * 11/2003 LeGare ................. F01N 11/002 60/277
6,766,641 B1 * 7/2004 Surnilla ................ F02D 41/028 60/285
6,865,880 B2 * 3/2005 Iihoshi .................. F02D 41/024 60/285
7,047,727 B2 * 5/2006 Tanaka ................ F02D 41/0255 60/274
7,707,821 B1 * 5/2010 Legare .................. F01N 11/002 60/277
8,156,923 B2 * 4/2012 Lorenz .................. F02D 35/027 123/406.45
8,521,405 B2 * 8/2013 Maruyama .......... F02D 41/1454 701/109
2002/0119080 A1 * 8/2002 Imada .................. B01D 53/944 422/168
2008/0236144 A1 * 10/2008 Nakata .................... F02D 37/02 60/284
2009/0031706 A1 * 2/2009 Miyashita ................. F01N 9/00 60/285
2011/0265761 A1 * 11/2011 Amann ................. F02D 35/027 123/406.11
2011/0265762 A1 * 11/2011 Lorenz .................. F02P 5/1528 123/406.45
2014/0157760 A1 * 6/2014 Tufail ................. F02D 41/0275 60/274
2016/0265466 A1 * 9/2016 Suzuki ...................... F01N 3/10
2016/0265467 A1 9/2016 Hokuto et al.
2017/0058805 A1 * 3/2017 Ford ..................... F01N 3/0885
2017/0145946 A1 * 5/2017 Korenaga ............. F02D 41/008
2018/0119665 A1 * 5/2018 Glugla .................... F02P 9/002

FOREIGN PATENT DOCUMENTS

JP H11-511226 A 9/1999
JP 2016-169665 9/2016
JP 2016-223386 12/2016
WO WO97/17532 A1 5/1997

* cited by examiner

CONTROLLER FOR INTERNAL COMBUSTION ENGINE AND METHOD FOR CONTROLLING INTERNAL COMBUSTION ENGINE

BACKGROUND

The present invention relates to a controller for an internal combustion engine and a method for controlling an internal combustion engine.

For example, Japanese Laid-Open Patent Publication No. 2016-223386 describes a controller that performs a dither control process in which when there is a request to raise the temperature of a catalytic device (an exhaust purifying device), some of the multiple cylinders are each set as a rich combustion cylinder having an air-fuel ratio richer than a stoichiometric air-fuel ratio and the remaining cylinders are each set as a lean combustion cylinder having an air-fuel ratio leaner than the stoichiometric air-fuel ratio. In the dither control process, the controller performs control for periodically switching the cylinder that is set as a rich combustion cylinder.

SUMMARY

When a specified cylinder is set as one of a rich combustion cylinder and a lean combustion cylinder, the rotational variation of the internal combustion engine may be increased depending on operating points of the internal combustion engine. This may be caused by various factors such as, for example, the resonance frequency of the power train including the internal combustion engine and the positional relationship between the internal combustion engine and other devices. If the cylinder that is set as a rich combustion cylinder is periodically switched at such operating points, when the specified cylinder described above is set as a rich combustion cylinder or a lean combustion cylinder, the rotational variation may be prominent.

Some aspects and advantages of the present invention are as follows.

1. In a controller for an internal combustion engine, the internal combustion engine includes an exhaust purifying device configured to purify exhaust gas discharged from a plurality of cylinders and a plurality of fuel injection valves respectively provided for the plurality of cylinders. The controller includes processing circuitry. The processing circuitry is configured to perform, a dither control process that operates the fuel injection valves such that at least one of the plurality of cylinders is a rich combustion cylinder having an air-fuel ratio richer than a stoichiometric air-fuel ratio and an other at least one of the plurality of cylinders is a lean combustion cylinder having an air-fuel ratio leaner than the stoichiometric air-fuel ratio. The dither control process includes a first mode in which the at least one cylinder serving as the rich combustion cylinder is sequentially changed so that each of the plurality of cylinders is sequentially set as the rich combustion cylinder and a second mode in which at least one specified cylinder in the plurality of cylinders is fixed as one of the rich combustion cylinder and the lean combustion cylinder. The processing circuitry is configured to select the first mode or the second mode based on an operating point of the internal combustion engine.

In a method for controlling an internal combustion engine, the internal combustion engine includes an exhaust purifying device configured to purify exhaust gas discharged from a plurality of cylinders and a plurality of fuel injection valves respectively provided for the plurality of cylinders.

The method includes performing a dither control process that operates the fuel injection valves such that at least one of the plurality of cylinders is a rich combustion cylinder having an air-fuel ratio richer than a stoichiometric air-fuel ratio and an other at least one of the plurality of cylinders is a lean combustion cylinder having an air-fuel ratio leaner than the stoichiometric air-fuel ratio. The dither control process includes a first mode in which the at least one cylinder serving as the rich combustion cylinder is sequentially changed so that each of the plurality of cylinders is sequentially set as the rich combustion cylinder and a second mode in which at least one specified cylinder in the plurality of cylinders is fixed as one of the rich combustion cylinder and the lean combustion cylinder. The method further includes selecting the first mode or the second mode based on an operating point of the internal combustion engine.

The above configuration has the second mode in which at least one of the cylinders is fixed as one of the rich combustion cylinder and the lean combustion cylinder. This reduces the rotational variation of the internal combustion engine. More specifically, when it is assumed that the first mode is continued, a cylinder that is desirable to be fixed as a rich combustion cylinder may be set as a lean combustion cylinder, and a cylinder that is desirable to be fixed as a lean combustion cylinder may be set as a rich combustion cylinder. This may result in increases in the rotational variation of the internal combustion engine depending on operating points of the internal combustion engine (hereinafter referred to as specific operating point). With the above configuration, the rotational variation of the internal combustion engine is reduced by selecting the second mode at the specific operating point. Further, with the above configuration, the first mode or the second mode is selected so that at least one cylinder will not be unnecessarily fixed as a rich combustion cylinder or a lean combustion cylinder at points other than the specific operating point.

2. In the controller for an internal combustion engine according to the first aspect, the processing circuitry is configured to perform a specified cylinder process that deviates an operation amount for controlling combustion of the at least one specified cylinder from an operation amount for controlling combustion of one of the plurality of cylinders excluding the at least one specified cylinder at a predetermined operating point of the internal combustion engine regardless of whether the dither control process is performed or not and perform the dither control process in the second mode at the predetermined operating point.

At the predetermined operating point, the rotational variation of the crankshaft and/or vibration of the power train may increase due to, for example, the positional relationship between the internal combustion engine and a power train excluding the internal combustion engine and the resonance frequency of the power train. In this case, the above specified cylinder process can deviate only the operation amount for the combustion control of the specified cylinder from the operation amount for the combustion control of the remaining cylinders to reduce the rotational variation and the vibration. However, in this case, when the specified cylinder is set as a rich combustion cylinder or a lean combustion cylinder by the dither control process, combustion performance may particularly deteriorate, and ultimately, the rotational variation may increase. In this regard, in the above configuration, the specified cylinder is fixed as one of the rich combustion cylinder and the lean combustion cylinder at the predetermined operating point so that the rotational variation is reduced.

3. In the controller for an internal combustion engine according to the second aspect, the specified cylinder process includes a process that retards an ignition timing of the at least one specified cylinder from an ignition timing of the one of the plurality of cylinders excluding the at least one specified cylinder. The processing circuitry is configured to fix the at least one specified cylinder as the rich combustion cylinder in the second mode.

When the ignition timing of the specified cylinder is retarded by the specified cylinder process, if the air-fuel ratio of the specified cylinder is set to be lean, the rotational variation may increase. This is because the retardation of the ignition timing can promote deterioration of the combustion performance in a lean combustion cylinder as compared to a cylinder in which the air-fuel ratio is set to a stoichiometric air-fuel ratio. Thus, in the above configuration, the specified cylinder is fixed as a rich combustion cylinder.

4. In the controller for an internal combustion engine according to any one of the first to third aspects, the processing circuitry is configured to perform, in the first mode, a gradual change process that gradually reduces an enrichment degree of a first cylinder serving as the rich combustion cylinder and a lean degree of a second cylinder serving as the lean combustion cylinder at a first reduction rate to change the first cylinder into the lean combustion cylinder and the second cylinder into the rich combustion cylinder and thereafter gradually increases an enrichment degree of the second cylinder and a lean degree of the first cylinder. The gradual change process includes a process that reduces the enrichment degree of the rich combustion cylinder and the lean degree of the lean combustion cylinder at a second reduction rate that is greater than the first reduction rate when the dither control process transitions from the first mode to the second mode.

When switching from the first mode to the second mode takes a long time, the period during which the rotational variation can be increased may be prolonged. In this regard, in the above configuration, upon transition from the first mode to the second mode, the enrichment degree of the rich combustion cylinder and the lean degree of the lean combustion cylinder are reduced at an increased rate immediately before the change to shorten the period during which the rotational variation can be increased.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

One embodiment of a controller for an internal combustion engine will hereinafter be described with reference to the accompanying drawings.

Figure 1:
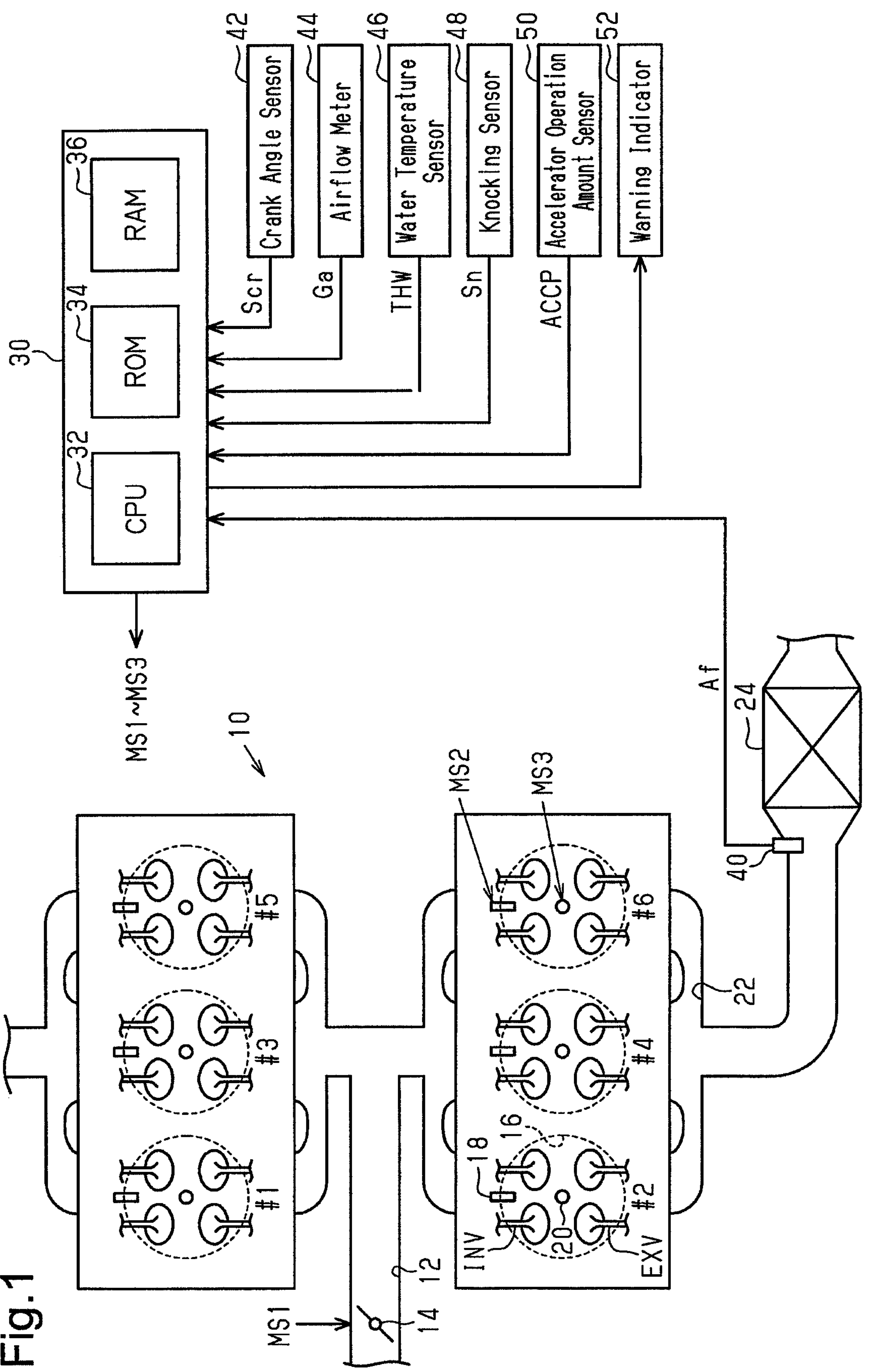
FIG. 1 shows one embodiment of an internal combustion engine and a controller for the internal combustion engine.

An internal combustion engine 10 shown in FIG. 1 is mounted on a vehicle and is a V6-type. The timing for closing an intake valve INV can be retarded from the timing at which the piston reaches bottom dead center. In the internal combustion engine 10, a throttle valve 14 is provided in an air-intake passage 12. Air is drawn from the air-intake passage 12 and flows into combustion chambers 16 of cylinders #1 to #6 when the intake valves INV are open. The cylinders #1 to #6 are each provided with a fuel injection valve 18 injecting fuel and an ignition device 20 producing spark discharge. In each combustion chamber 16, air-fuel mixture is used for combustion, and the burned mixture is discharged as exhaust gas into an exhaust passage 22 when an exhaust valve EXV is open. A three-way catalyst 24 capable of storing oxygen is provided in the exhaust passage 22. In the internal combustion engine 10 according to the present embodiment, the exhaust purifying device that purifies exhaust gas discharged from the cylinders #1, #3, and #5 differs from the exhaust purifying device that purifies exhaust gas discharged from the cylinders #2, #4, and #6. In FIG. 1, the three-way catalyst 24 is exemplified serving as the exhaust purifying device that purifies exhaust gas discharged from the cylinders #2, #4, and #6. FIG. 1 does not show the three-way catalyst serving as the exhaust purifying device that purifies exhaust gas discharged from the cylinders #1, #3, and #5.

A controller 30 operates operational parts of the internal combustion engine 10 including, for example, the throttle valve 14, the fuel injection valve 18, and the ignition device 20 to control the internal combustion engine 10 and the engine aspects (torque, exhaust constituent, etc.) of the internal combustion engine 10. When operating the operational parts, the controller 30 refers to an air-fuel ratio Af detected by an air-fuel ratio sensor 40 provided on the upstream side of the three-way catalyst 24, an output signal Scr from a crank angle sensor 42, an air-intake amount Ga detected by an airflow meter 44, and a temperature (water temperature THW) of cooling water in the internal combustion engine 10 detected by a water temperature sensor 46. The controller 30 also interprets an output signal Sn from a knocking sensor 48 and a depression amount of the accelerator pedal (accelerator operation amount ACCP) detected by an accelerator operation amount sensor 50. The controller 30 includes a CPU 32, ROM 34, and RAM 36 and controls the engine aspects described above by executing programs stored in the ROM 34 with the CPU 32.

Figure 2:
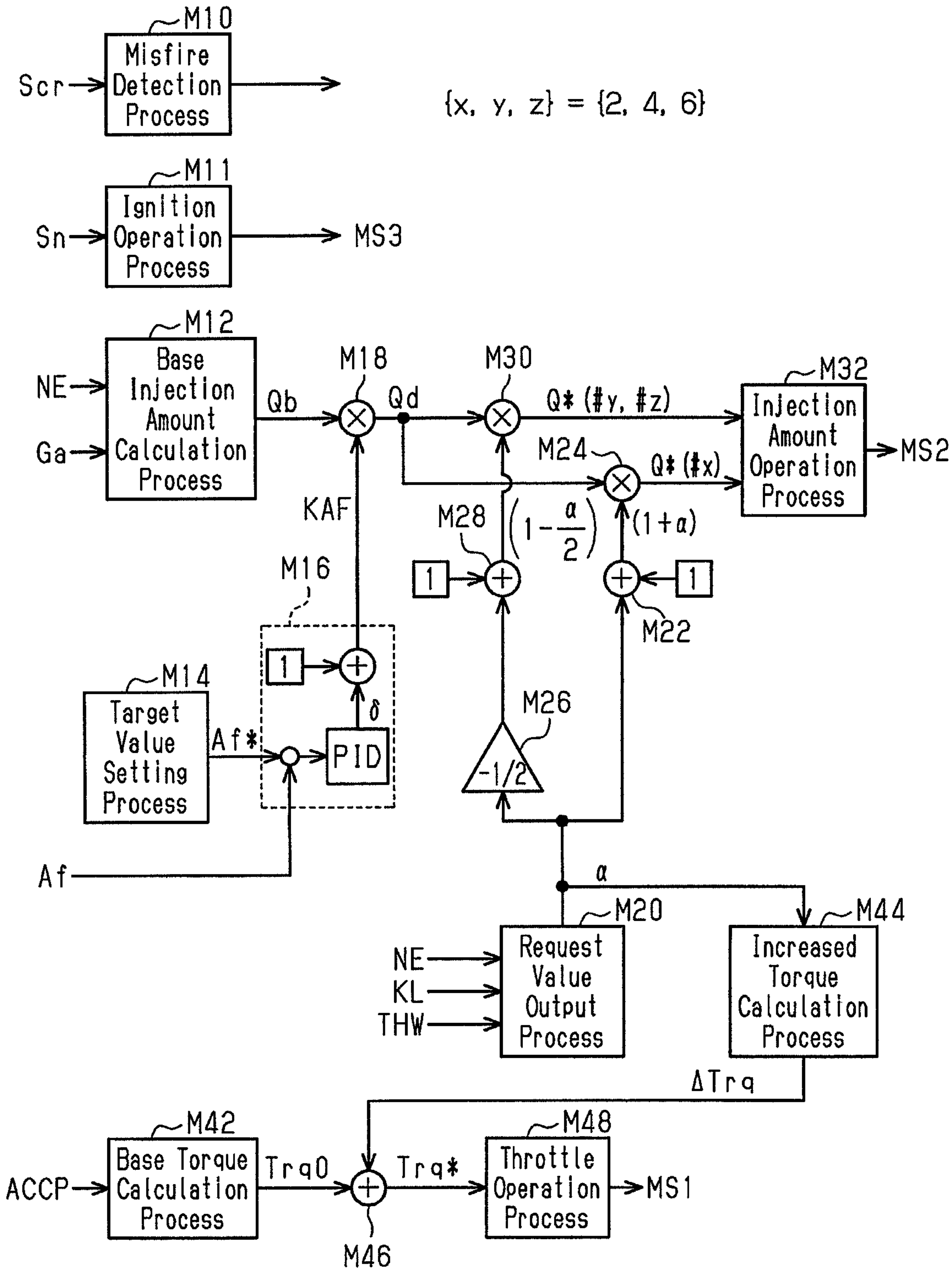
FIG. 2 is a block diagram showing some of the processes performed by the controller in FIG. 1.

FIG. 2 shows some of the processes achieved by the CPU 32 executing the programs stored in the ROM 34. For the sake of convenience, FIG. 2 shows the processes performed on the three cylinders #2, #4, and #6 and does not show the processes performed on the cylinders #1, #3, and #5 as the operational processes of the fuel injection valves 18. The processes performed on the cylinders #1, #3, and #5 are the same as those performed on the cylinders #2, #4, and #6.

A misfire detection process M10 determines an occurrence of misfire based on the output signal Scr. the misfire detection process M10 includes a process that temporarily determines an occurrence of misfire when a rotational variation amount $\Delta\omega$ calculated based on the output signal Scr is equal to or smaller than a negative threshold value. The controller 30 calculates an instantaneous rotation speed co corresponding to the timing at which the piston reaches a compression top dead center. More specifically, the instantaneous rotation speed co is an average rotation speed within a predetermined angular range including a crank angle corresponding to a single timing at which the piston reaches a compression top dead center. The rotational variation amount & is a value obtained by subtracting, from an instantaneous rotation speed co corresponding to the timing at which the piston in a cylinder reaches a compression top dead center, an instantaneous rotation speed w corresponding to the timing at which the piston in another cylinder next reaches a compression top dead center. The misfire detection process M10 includes a process that formally determines the occurrence of misfire when the number of temporary determinations of the occurrence of misfire is equal to or larger than a threshold value in a period during which the crankshaft of the internal combustion engine 10 rotates a predetermined number of times. The process then operates a warning indicator 52 shown in FIG. 1 to notify the user of the occurrence of misfire. The misfire detection process M10 also includes a process that resets the history of temporary determinations every predetermined number of times.

Figure 3:
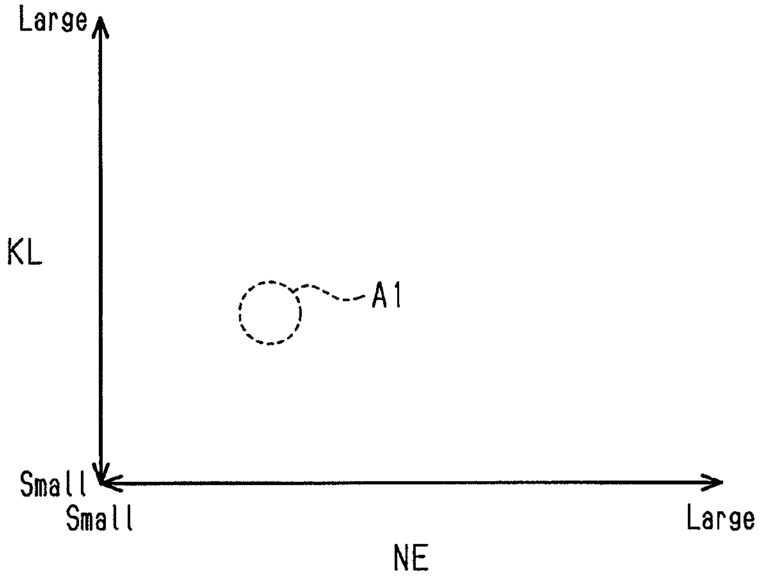
FIG. 3 shows a region in which the ignition timing of a specified cylinder is retarded by the controller in FIG. 1.
Figure 4:
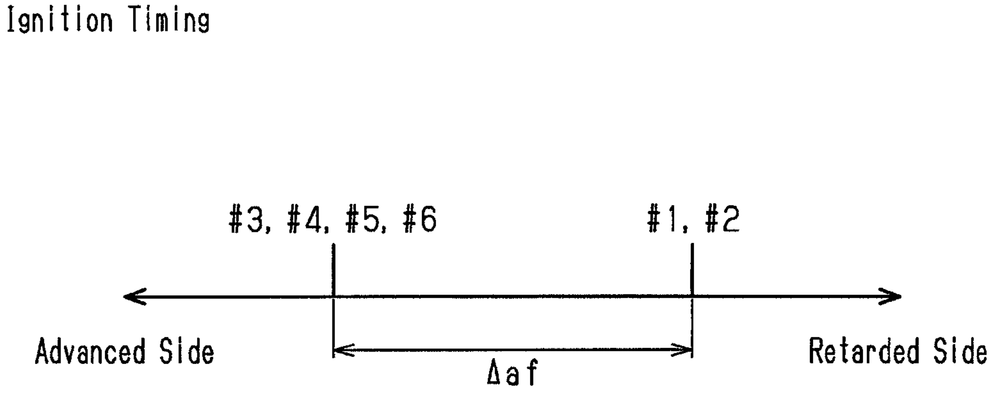
FIG. 4 is a time chart showing an approach in which the ignition timing of the specified cylinder is set by the controller in FIG. 1.

An ignition operation process M11 outputs an operational signal MS3 to the ignition device 20 to operate the ignition timing of the ignition device 20. More specifically, the ignition operation process M11 generally includes a process in which the ignition timing is operated to be MBT (Minimum advance for the Best Torque) and a process in which the ignition timing is operated to be retarded from the MBT when an occurrence of knocking is determined based on the output signal Sn from the knocking sensor 48. FIG. 3 shows operating points of the internal combustion engine 10 that are defined by a rotation speed NE calculated based on the output signal Scr from the crank angle sensor 42 and a load factor KL. As shown in FIG. 4, the ignition operation process M11 includes a process that retards the ignition timing of only the cylinders #1 and #2 from that of the cylinders #3 to #6 by a predetermined amount Δaf at an operating point within a predetermined region A1 shown in FIG. 3. This setting is to limit increases in the vibration caused by, for example, a resonance action of the power train including the internal combustion engine 10 when the operating point of the internal combustion engine 10 is in the region A1. An experiment was conducted in which the internal combustion engine 10 ran with all of the cylinders #1 to #6 set to have the same ignition timing and found that vibration increased when the operating point of the internal combustion engine 10 was in the region A1. The experiment also found that the vibration was reduced by retarding the ignition timing of only the cylinders #1 and #2 when the operating point of the internal combustion engine 10 was in the region A1. Hence, the ignition operation process M11 includes the process that retards the ignition timing of only the cylinders #1 and #2 from that of the other cylinders #3 to #6 by the predetermined amount Δaf when the operating point of the internal combustion engine 10 is in the region A1.

This may be achieved by, for example, storing in the ROM 34 map data including the rotation speed NE and the load factor KL as input variables and the predetermined amount Δaf as an output variable and then causing the CPU 32 to obtain the predetermined amount Δaf through mapping calculation. The map data is combination data of discrete values of input variables and values of output variables corresponding to the values of the respective input variables. The mapping calculation may be, for example, a process that, when the values of the input variables match any of the values of the input variables of the map data, outputs the value of the corresponding output variable of the map data as a calculation result. When there is no match, the process outputs a value obtained by interpolating the values of the multiple output variables included in the map data as a calculation result. The load factor KL is a ratio of an inflow air amount to a reference inflow air amount per combustion cycle of a cylinder. In the present embodiment, the reference inflow air amount is defined as an inflow air amount per combustion cycle of a cylinder when the open degree of the throttle valve 14 is maximal. The reference inflow air amount may be variably set in accordance with the rotation speed NE.

As shown in FIG. 2, a base injection amount calculation process M12 calculates a base injection amount Qb as an open loop operation amount serving as an operation amount for adjusting the air-fuel ratio of the mixture in the combustion chambers 16 to be a target air-fuel ratio through open loop control based on the rotation speed NE and the air-intake amount Ga. The target air-fuel ratio is, for example, a stoichiometric air-fuel ratio.

A target value setting process M14 sets a target value Af* of a feedback control amount for controlling the air-fuel ratio of the mixture in the combustion chambers 16 to the above target air-fuel ratio.

A feedback process M16 calculates a feedback operation amount KAF that is an operation amount for adjusting the air-fuel ratio Af, or the feedback control amount, to the target value Af* through feedback control. In the present embodiment, the difference between the target value Af* and the air-fuel ratio Af is input to a proportional element, an integral element, and a differentiation element, and an output value of the proportional element, an output value of the integral element, and an output value of the differentiation element are added up to calculate the correction rate 5 of the base injection amount Qb. The feedback operation amount KAF is "1+δ."

A feedback correction process M18 corrects the base injection amount Qb by multiplying the base injection amount Qb and the feedback operation amount KAF to calculate a request injection amount Qd.

A request value output process M20 calculates and outputs an injection amount correction request value α, which is an injection amount correction value for dither control that causes the air-fuel ratio of the mixture used for combustion to differ between the cylinders. However, the fuel injection amount of each cylinder is set such that the constituent of the entire exhaust gas discharged from the cylinders #1, #3, and #5 (#2, #4, and #6) of the internal combustion engine 10 is equivalent to that when the air-fuel ratio of the mixture used for combustion in all of the cylinders #1, #3, and #5 (#2, #4, and #6) is set to be the target air-fuel ratio. "The fuel injection amount of each cylinder is set such that the constituent of the entire exhaust gas discharged from the cylinders #1, #3, and #5 (#2, #4, and #6) of the internal combustion engine 10 is equivalent to that when the air-fuel ratio of the mixture used for combustion in all of the cylinders #1, #3, and #5 (#2, #4, and #6) is set to be the target air-fuel ratio" refers to the fuel injection amount being set such that the entire exhaust gas discharged from the cylinders #1, #3, and #5 (#2, #4, and #6) contains unburned fuel constituent and oxygen that react with each other without excess or deficiency. In the dither control according to the present embodiment, one of the three cylinders #2, #4, and #6 is set as a rich combustion cylinder, the air-fuel ratio of the mixture of which is richer than a stoichiometric air-fuel ratio, while the remaining two cylinders are set as lean combustion cylinders, the air-fuel ratio of the mixture of which is leaner than the stoichiometric air-fuel ratio. Then, the injection amount in the rich combustion cylinder is set to be "1+α" times greater than the above request injection amount Qd, while the injection amount in the lean combustion cylinders is set to be "1−(α/2)" times greater than the request injection amount Qd. With the setting of the injection amount of the lean combustion cylinders and the rich combustion cylinder described above, when the cylinders #2, #4, and #6 are filled with the same amount of air, the constituent of the entire exhaust gas discharged from the cylinders #2, #4, and #6 is equivalent to that when the air-fuel ratio of the mixture used for combustion in all of the cylinders #2, #4, and #6 is set to be the target air-fuel ratio, With the setting of the injection amount described above, when the cylinders #2, #4, and #6 are filled with the same amount of air, the inverse of the average value of fuel-air ratios of the mixture used for combustion in each cylinder is the target air-fuel ratio. The fuel-air ratio is the inverse of the air-fuel ratio.

A correction coefficient calculation process M22 adds the injection amount correction request value α to "1" to calculate a correction coefficient of the request injection amount Qd for a rich combustion cylinder. A dither correction process M24 multiplies the request injection amount Qd and the correction coefficient "1+α" to calculate an injection amount command value Q* of the cylinder #x that is set as a rich combustion cylinder. Herein, "x" designates any one of "2", "4," and "6."

A multiplication process M26 multiplies the injection amount correction request value α and "−½." A correction coefficient calculation process M28 adds the output value of the multiplication process M26 to "1" to calculate a correction coefficient of the request injection amount Qd for a lean combustion cylinders. A dither correction process M30 multiplies the request injection amount Qd and the correction coefficient "1−(α/2)" to calculate an injection amount command value Q* of the cylinders #y and #z that are set as lean combustion cylinders. Herein, "y" and "z" each designate any one of "2," "4," and "6" where "x," "y," and "z" differ from each other.

An injection amount operation process M32 generates an operation signal MS2 for the fuel injection valve 18 of the cylinder #x, which is set as a rich combustion cylinder, based on the injection amount command value Q* output in the dither correction process M24 and then outputs the operation signal MS2 to the fuel injection valve 18 to operate the fuel injection valve 18 so that the amount of fuel injected from the fuel injection valve 18 corresponds to the injection amount command value Q*. Additionally, the injection amount operation process M32 generates an operation signal MS2 for the fuel injection valves 18 of the cylinders #y, #z, which are set as lean combustion cylinders, based on the injection amount command value Q* output in the dither correction process M30 and then outputs the operation signal MS2 to the fuel injection valves 18 to operate the fuel injection valves 18 so that the amount of fuel injected from the fuel injection valves 18 corresponds to the injection amount command value Q*.

A base torque calculation process M42 calculates a base torque Trq0, which is a base torque value for the internal combustion engine 10, based on the accelerator operation amount ACCP. More specifically, when the accelerator operation amount ACCP is large, the base torque calculation process M42 calculates the base torque Trq0 to be a larger value than when the accelerator operation amount ACCP is small.

An increased torque calculation process M44 calculates an increased torque ΔTrq, which is a value for increasing the base torque Trq0, based on the injection amount correction request value α. More specifically, the increased torque calculation process M44 sets the increased torque ΔTrq to zero when the injection amount correction request value α is zero and sets the increased torque ΔTrq to a larger value as the injection amount correction request value α increases.

A request torque calculation process M46 adds the increased torque ΔTrq to the base torque Trq0 to calculate a request torque Trq* to the internal combustion engine 10.

A throttle operation process M48 generates and outputs an operation signal MS1 to the throttle valve 14 based on the request torque Trq* to adjust the open degree of the throttle valve 14. More specifically, the throttle operation process M48 operates the throttle valve 14 to increase the open degree when the request torque Trq* is large as compared to when the request torque Trq* is small. The throttle operation process M48 according to the present embodiment sets the open degree of the throttle valve 14 to achieve the base torque trq0. When the dither control is not performed, the increased torque ΔTrq is set to zero and therefore, the throttle operation process M48 sets the open degree of the throttle valve 14 based on a request torque Trq* that is equal to the base torque Trq0. When the dither control is performed, the torque decreases as compared to when all of the cylinders have the same air-fuel ratio. When the dither control is performed, the throttle operation process M48 sets the open degree of the throttle valve 14 based on a request torque Trq* that is obtained by adding the increased torque ΔTrq to the base torque Trq0. That is, the increased torque ΔTrq is provided such that when the dither control is performed, the throttle operation process M48 sets the open degree of the throttle valve 14 to achieve the base torque Trq0. The reason why the torque is lower when the dither control is performed than when not performed is that the amount of reduction in the torque due to reducing correction of the request injection amount Qd in lean combustion cylinders is larger than the amount of increase in the torque due to increasing correction of the request injection amount Qd in rich combustion cylinders.

The request value output process M20 sets the injection amount correction request value α to a value greater than zero when a request for warming up the three-way catalyst 24 is made. In dither control performed in response to an execution request for the warm-up request, the temperature of the three-way catalyst 24 is raised by heat generated through reaction between oxygen discharged from the lean combustion cylinders and unburned fuel discharged from the rich combustion cylinder in the three-way catalyst 24.

Figure 5:
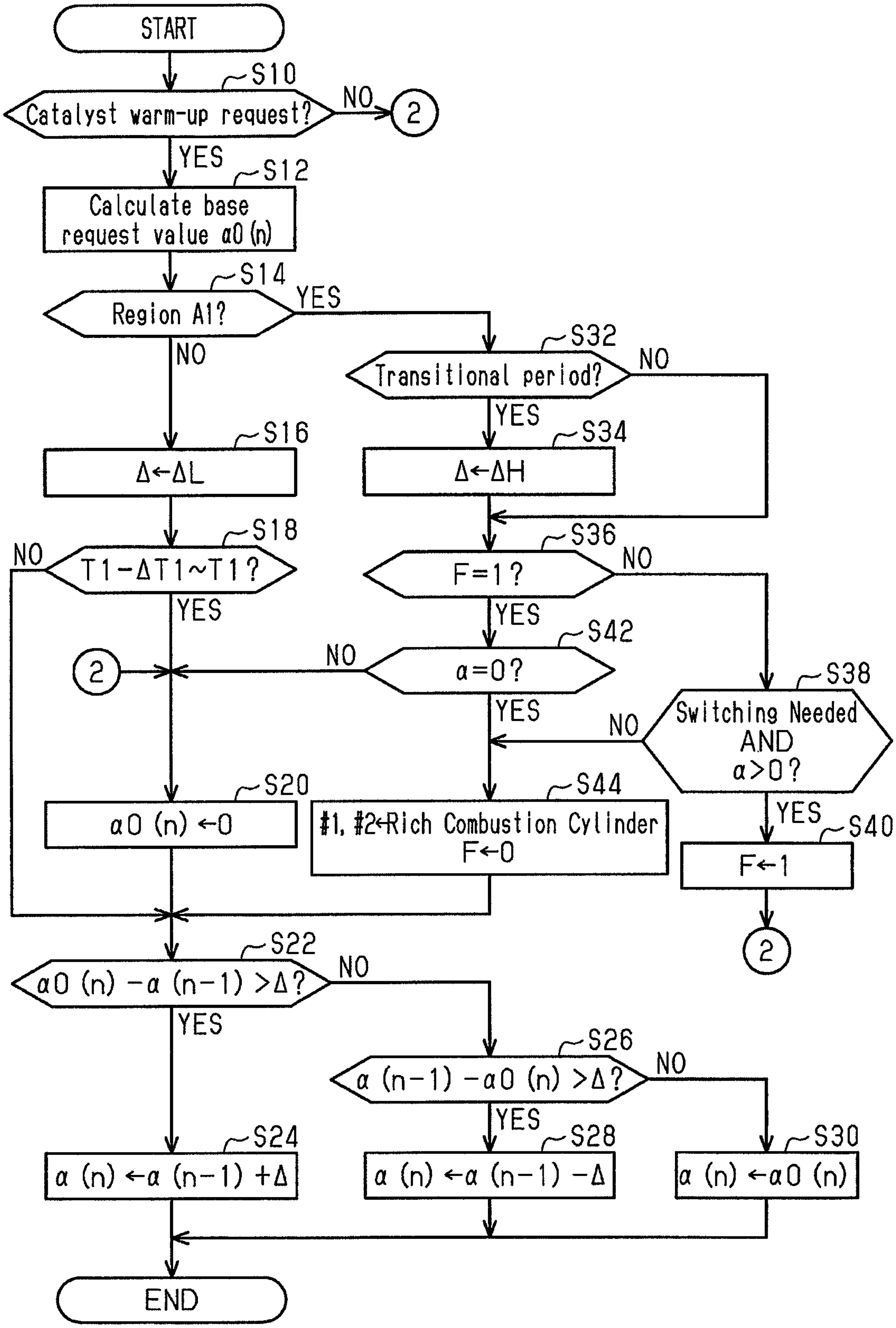
FIG. 5 is a flowchart showing a procedure of a request value output process performed by the controller in FIG. 1.

FIG. 5 shows a procedure of the request value output process M20. The process shown in FIG. 5 is achieved by the CPU 32, for example, repeatedly executing the program stored in the ROM 34 in a predetermined time cycle. Numerals prepended with "S" will hereinafter represent step numbers.

In the series of processes shown in FIG. 5, the CPU 32 first determines whether or not a request for warming up the three-way catalyst 24 is made (S10). The warm-up request of the three-way catalyst 24 is made when condition (A) and condition (B) are both satisfied. Condition (A) is that an integrated value InGa obtained by integrating the air-intake amount Ga from the start-up of the internal combustion engine 10 is equal to or greater than a first defined value Inth1. Condition (B) is that the integrated value InGa is equal to or smaller than a second defined value Inth2 and the water temperature THW is equal to or lower than a predetermined temperature THWth. Under condition (A), it is determined that the temperature of an upstream end of the three-way catalyst 24 is an activating temperature. Under condition (B), it is determined that the three-way catalyst 24 is not entirely in an active state.

When it is determined that a warm-up request of the three-way catalyst 24 is made (S10: YES), the CPU 32 calculates a base request value α0, which is the base of the injection amount correction request value α, based on the rotation speed NE and the load factor KL (S12). More specifically, the ROM 34 stores map data including the rotation speed NE and the load factor KL as input variables and the base request value α0 as an output variable, and the CPU 32 obtains the base request value α0 through mapping calculation. The variable "n" in FIG. 5 is used to specify certain data among time-series data of, for example, the base request value α0. In the description hereafter, in control cycles of the series of processes shown in FIG. 3, data calculated in the current control cycle is denoted by "n," and data calculated in the preceding control cycle is denoted by "n−1."

The CPU 32 next determines whether or not the operating point of the internal combustion engine 10 is in the region A1 shown in FIG. 3 (S14). When it is determined that the operating point of the internal combustion engine 10 is not in the region A1 (S14: NO), the CPU 32 assigns a normal gradual change amount ΔL to a gradual change amount Δ that specifies the gradual change rate of the injection amount correction request value α (S16). The normal gradual change amount ΔL specifies the gradual change rate of the injection amount correction request value α. As described above, the increased torque ΔTrq changes in accordance with a change in the injection amount correction request value α. The throttle valve 14 is operated so that the amount of air filling the combustion chambers 16 changes in accordance with a change in the increased torque ΔTrq. The normal gradual change amount ΔL is set to a value that sufficiently limits a follow-up delay of the amount of air filling the combustion chambers 16 that changes in accordance with changes in the increased torque ΔTrq.

The CPU 32 next determines whether or not the amount of time elapsed since the performance of dither control started or the amount of time elapsed since the rich combustion cylinders were changed among the cylinders #2, #4, and #6 (#1, #3, and #5) is within a predetermined range. The predetermined range is equal to or greater than the value obtained by subtracting a gradual change time ΔT1 from a period T1 and equal to or smaller than the value of the period T1. The period T1 is set to a period in which the crankshaft of the internal combustion engine 10 rotates a specified number of times, where the specified number of times is equal to or smaller than the predetermined number of times specified in the misfire detection process M10. The gradual change time ΔT1 is set to the time needed to gradually change the injection amount correction request value α to zero through the processes of S22 to S30 described below. When it is determined that the amount of elapsed time described above is within the predetermined range (S18: YES), the CPU 32 assigns zero to the base request value α0 (S20).

The rich combustion cylinder is changed in the period T1 for the following reasons. During the dither control, the absolute value of the rotational variation amount Δω tends to be larger than when the dither control is not performed because the torque of a rich combustion cylinder is higher than the torque of a lean combustion cylinder. However, the injection amount correction request value α is set, for example, so that the rotational variation is reduced to a level that is not perceivable by the user. Thus, generally, the misfire detection process M10 will not make a temporary determination of the occurrence of misfire caused by only the dither control. However, various factors cause, for example, only a specific one of the cylinders #1 to #6 to be slightly leaner than the target air-fuel ratio. An example of such factors is that only a particular fuel injection valve 18 deteriorates due to age and the fuel injection valve 18 injects fuel in an amount slightly smaller than the injection amount command value Q*. When the deteriorated cylinder is set as a lean combustion cylinder and the piston of the deteriorated cylinder reaches its compression top dead center, and another cylinder is set as a rich combustion cylinder and the piston of the cylinder next reaches its compression top dead center, the rotational variation amount Δω can be equal to or smaller than the threshold value. This may cause the misfire detection process M10 to erroneously determine that a misfire has occurred. However, it is difficult to set a threshold value that is compared with the rotational variation amount Δω in the misfire detection process M10 so that an occurrence of misfire will not be erroneously determined due to the dither control. This is because the threshold value needs to be set such that in the case of misfire, the occurrence of the misfire is reliably detected.

In this regard, in the present embodiment, the period T1 is set to be equal to or shorter than the period during which the misfire detection process M10 adds up the number of temporary determinations. There is a low probability that the period during which the misfire detection process M10 adds up the number of temporary determinations completely conforms to a specified period T1 in the dither control. Further, even when such complete conformance occurs, since the period during which one of the cylinders is set as a rich combustion cylinder includes the gradual change time ΔT1, a period during which the injection amount correction request value α is set to the base request value α0 is shorter than the period T1. For this reason, under a situation in which a cylinder, the air-fuel ratio of which is leaner than expected (e.g. deteriorated cylinder described above), is set as a lean combustion cylinder and the piston of the deteriorated cylinder reaches its compression top dead center, and the piston of another cylinder that next reaches its compression top dead center is a rich combustion cylinder, a period during which the situation can cause the rotational variation amount Δω to be equal to or smaller than the threshold value without resulting in misfire is shorter than the period during which the misfire detection process M10 adds up the number of temporary determinations. This limits erroneous determination of the misfire detection process M10.

When the process of S20 is completed or a negative determination is made in the process of S18, the CPU 32 determines whether or not the value obtained by subtracting the preceding injection amount correction request value α(n−1) from the current base request value α0(*n*) is greater than the gradual change amount Δ (S22). When it is determined that the value of α0(*n*)-α(n−1) is greater than the gradual change amount Δ (S22: YES), the CPU 32 then assigns the value obtained by adding the gradual change amount Δ to the preceding injection amount correction request value α(n−1) to the current injection amount correction request value α(n) (S24). When it is determined that the value of α0(*n*)-α(n−1) is equal to or smaller than the gradual change amount Δ (S22: NO), the CPU 32 then determines whether or not the value obtained by subtracting the current base request value α0(*n*) from the preceding injection amount correction request value α(n−1) is greater than the gradual change amount Δ (S26). When it is determined that the value of α(n−1)-α0(*n*) is greater than the gradual change amount Δ (S26: YES), the CPU 32 then assigns the value obtained by subtracting the gradual change amount Δ from the preceding injection amount correction request value α(n−1) to the current injection amount correction request value α(n) (S28). When it is determined that the value of α(n−1)-α0(*n*) is equal to or smaller than the gradual change amount Δ (S26: NO), the CPU 32 then assigns the current base request value α0(*n*) to the current injection amount correction request value α(n) (S30).

When it is determined that the operating point of the internal combustion engine 10 is in the region A1 (S14: YES), the CPU 32 determines whether or not the time elapsed since the operating point of the internal combustion engine 10 entered the region A1 is equal to or shorter than a transitional period (S32). The transitional period is set generally to be from when the operating point of the internal combustion engine 10 enters the region A1 to when the injection amount correction request value α becomes the base request value α0 after the rich combustion cylinder is switched from one cylinder to another through the process of S44 described below. When a positive determination is made (S32: YES), the CPU 32 assigns an A1 gradual change amount ΔH to the gradual change amount Δ (S34). The A1 gradual change amount ΔH is set to be a value greater than the normal gradual change amount ΔL.

When the process of S34 is completed or a negative determination is made in the process of S32, the CPU 32 determines whether or not a flag F is "1" (S36). The flag F being "1" indicates that the rich combustion cylinder needs to be switched from one cylinder to another due to an entrance of the operating point into the region A1 and that before the switching, the injection amount correction request value α for the rich combustion cylinders is greater than zero. In the present embodiment, when the operating point of the internal combustion engine 10 is in the region A1, the ignition timing of only the cylinders #1 and #2 is retarded from that of the cylinders #3 to #6 by a predetermined amount Oaf. Thus, the cylinders #1 and #2 may be fixed as a rich combustion cylinder when the operating point is in the region A1. When it is determined that the flag F is "0" (S36: NO), the CPU 32 determines whether or not the rich combustion cylinder needs to be switched from one cylinder to another because the cylinders #1 and #2 are not currently set as a rich combustion cylinder and also determines whether or not the injection amount correction request value α is greater than zero (S38). When a positive determination is made in S38 (S38: YES), the CPU 32 then assigns "1" to the flag F (S40) and proceeds to the process of S20.

On the other hand, when it is determined that the flag F is "1" (S36: YES), the CPU 32 determines whether or not the injection amount correction request value α is zero (S42). When it is determined that the injection amount correction request value α is not zero (S42: NO), the CPU 32 then proceeds to the process of S20. On the other hand, when a positive determination is made in the process of S42 or a negative determination is made in the process of S38, the CPU 32 sets the cylinders #1 and #2 as a rich combustion cylinder and sets the flag F to "0" (S44) and proceeds to the process of S22.

When the process of S24, S28, or S30 is completed, the CPU 32 temporarily terminates the series of processes shown in FIG. 5.

Operations and effects of the present embodiment will be described.

Figure 6:
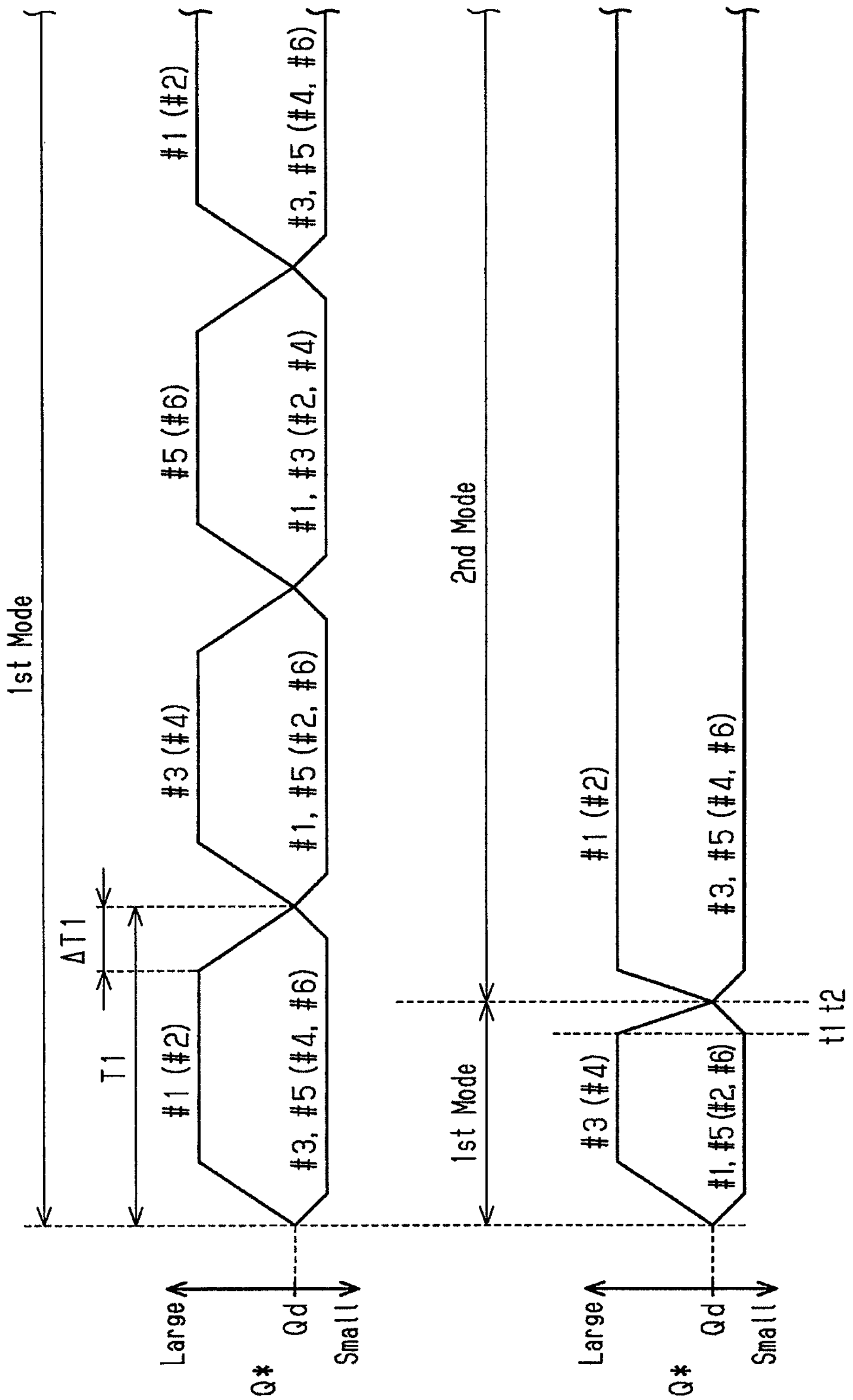
FIG. 6 is a time chart showing a first mode and a second mode performed by the controller in FIG. 1.

FIG. 6 shows the injection amount command value Q* upon switching from the first mode of dither control when the operating point of the internal combustion engine 10 does not enter the region A1 to the second mode of dither control when the operating point enters the region A1.

As shown in FIG. 6, in the present embodiment, the rich combustion cylinder is switched in order from the cylinder #1 (#2) to the cylinder #3 (#4) and then to the cylinder #5 (#6) in the first mode. In the first mode, the rich combustion cylinder is switched in the period T1. When the operating point is in the region A1 at time t1, the CPU 32 fixes the cylinders 1 #and #2 as a rich combustion cylinder. When the cylinders #1 and #2 are not set as a rich combustion cylinder (S38: YES), the CPU 32 sets the base request value α0 to zero through the process of S20 to temporarily reduce the injection amount correction request value α to zero. At this time, the gradual change rate, which is specified by the A1 gradual change amount ΔH, is greater than when the injection amount correction request value α is gradually changed to zero to switch the rich combustion cylinder in the first mode. This can minimize the period during which the cylinders #1 and #2 having the ignition timing retarded from the other cylinders by a predetermined amount Δaf are set as lean combustion cylinders. The combustion in the lean combustion cylinders tends to be more unstable as compared to when the air-fuel ratio is set at a stoichiometric air-fuel ratio. The retardation of the ignition timing may promote the tendency toward unstableness. The present embodiment minimizes the period during which such unstableness is possibly promoted and maximally limits increases in the rotational variation.

When the injection amount correction request value α becomes zero at time t2 (S42: YES), the CPU 32 then increases the injection amount correction request value α at a gradual change rate specified by the A1 gradual change amount ΔH while setting the cylinders #1 and #2 as a rich combustion cylinder through the process of S44. This maximally limits decreases in the temperature rise effect produced by the dither control that are caused by the switching of the cylinders #1 and #2 to a rich combustion cylinder.

Correspondence Relationship

The correspondence relationship between the items in the above embodiment and the items described in the section "SUMMARY" is as follows. The correspondence relationship is described for the number of each aspect described in the section "SUMMARY."

[1] The exhaust purifying device corresponds to the three-way catalyst 24. The dither control process corresponds to the correction coefficient calculation process M22, the dither correction process M24, the multiplication process M26, the correction coefficient calculation process M28, the dither correction process M30, and the injection amount operation process M32 when the injection amount correction request value α is greater than zero. The first mode corresponds to the dither control process when a negative determination is made in the process of S14. The second mode corresponds to the dither control when a positive determination is made in the process of S42 or when a negative determination is made in the process of S38.

[2] The specified cylinder process corresponds to the process shown in FIG. 4. The predetermined operating point corresponds to the operating point within the region A1.

[4] The gradual change process corresponds to the processes of S22 to S30.

OTHER EMBODIMENTS

The present embodiment can be modified and practiced as follows. The present embodiment and the following modifications may be practiced in combination within the scope where no technical inconsistency occurs.

"Second Mode"

As will be described in the section "Internal Combustion Engine" below, for example, in an in-line six-cylinder internal combustion engine, two of the cylinders may be set as rich combustion cylinders, and the remaining four cylinders may be set as lean combustion cylinders. At a predetermined operating point, when the ignition timing of only the cylinder #1 is retarded from that of the other cylinders #2 to #6, the cylinder #1 may only be fixed as a rich combustion cylinder during the dither control. Any one of the cylinders #2 to #6 may be set as a rich combustion cylinder, and the rich combustion cylinder may be sequentially changed.

"Gradual Change Rate"

In the above embodiment, when the cylinders #1 and #2 are not set as a rich combustion cylinder at a point in time when the operating point enters the region A1, the gradual change rate is specified by the A1 gradual change amount $\Delta H$ until the cylinders #1 and #2 are set as a rich combustion cylinder and the injection amount correction request value $\alpha$ becomes the base request value $\alpha\mathbf{0}$. However, embodiments are not limited thereto. For example, when the cylinders #1 and #2 are not set as a rich combustion cylinder at a point in time when the operating point enters the region A1, the gradual change rate may be specified by the A1 gradual change amount $\Delta H$ until the injection amount correction request value $\alpha$ temporarily becomes zero and thereafter the gradual change rate may be defined by the normal gradual change amount $\Delta L$.

In the above embodiment, the gradual change rate during transition from the first mode to the second mode is higher than that in the first mode. However, embodiments are not limited thereto. For example, the rates may be equal to each other. Alternatively, for example, the cylinders #1 and #2 may each be switched to a rich combustion cylinder without performing the gradual change process during transition from the first mode to the second mode.

"Purpose for Changing Rich Combustion Cylinder"

In the above embodiment, the rich combustion cylinder is changed from one cylinder to another to reduce erroneous determinations in the misfire detection process M10. However, the purpose for changing the rich combustion cylinder from one cylinder to another is not limited thereto. For example, the rich combustion cylinder may be switched from one cylinder to another for the purpose such as eliminating a concern that when a cylinder is fixed as the rich combustion cylinder, unburned fuel unevenly flows into the three-way catalyst 24. Additionally or alternatively, for example, the rich combustion cylinder may be switched from one cylinder to another in view of the fact that the fuel injection valve 18 of a rich combustion cylinder is more likely to collect carbon than the fuel injection valve 18 of a lean combustion cylinder due to the fuel splashing back to the vicinity of the injection port. In such a case, the period T1 may be set to be sufficiently longer than that of the above embodiment.

"Specified Cylinder Process"

The specified cylinder process is not limited to a process that retards the ignition timing of the specified cylinder from that of the remaining cylinders. For example, the process may advance the ignition timing of the specified cylinder from that of the remaining cylinders. In this case, the specified cylinder may be fixed as a lean combustion cylinder in the second mode. Moreover, the specified cylinder process is not limited to a process that causes the specified cylinder and the remaining cylinders to have different ignition timings.

Regardless of whether or not the specified cylinder process is used, the dither control may have the second mode. For example, when the dither control is performed at a predetermined operating point, if, for example, setting the specified cylinder as a rich combustion cylinder (lean combustion cylinder) causes prominent vibration, the specified cylinder may be set as a lean combustion cylinder (rich combustion cylinder).

"Dither Control Process"

In the above embodiment, the base request value $\alpha\mathbf{0}$ is calculated based on the rotation speed NE and the load factor KL. However, embodiments are not limited thereto. For example, the value obtained by multiplying a base value defined according to the water temperature THW by a correction coefficient K derived from the rotation speed NE and the load factor KL may be set to the base request value $\alpha\mathbf{0}$.

Alternatively, for example, the base request value $\alpha\mathbf{0}$ may be variably set based on only two parameters, that is, the rotation speed NE and the water temperature THW or the load factor KL and the water temperature THW. Alternatively, for example, the base request value $\alpha\mathbf{0}$ may be variably set based on only one of the above three parameters. For example, instead of using the rotation speed NE and the load factor KL as parameters for specifying the operating point of the internal combustion engine 10, the accelerator operation amount as a load may be used instead of the load factor KL as a load. Instead of the rotation speed NE and the load, the base request value $\alpha\mathbf{0}$ may be variably set based on the air-intake amount Ga.

It is not essential to variably set the injection amount correction request value $\alpha$ based on the operating point of the internal combustion engine. For example, it may be a single value specified for a catalyst warm-up process.

In the above embodiment, the number of lean combustion cylinders is greater than the number of rich combustion cylinders. However, embodiments are not limited thereto. For example, as will be described below in the section "Internal Combustion Engine," when a single exhaust purifying device purifies exhaust gas of an even number of cylinders, the number of rich combustion cylinders and the number of lean combustion cylinders may be equal to each other. Alternatively, for example, all cylinders in which exhaust gas is to be purified by a single exhaust purifying device are not limited to be used as lean combustion cylinders or rich combustion cylinders and, for example, the air-fuel ratio of one cylinder may be set as a target air-fuel ratio. Further, when the cylinders are filled with the same amount of air in one combustion cycle, the inverse of the average value of the fuel-air ratio may not be a target air-fuel ratio. For example, as will be described, below in the section "Internal Combustion Engine," in the case of an in-line four-cylinder, when the cylinders are filled with the same amount of air, the inverse of the average value of the fuel-air ratio in five strokes may be the target air-fuel ratio or the inverse of the average value of the fuel-air ratio in three strokes may be the target air-fuel ratio. In this case, a period during which both a rich combustion cylinder and a lean combustion cylinder exist in a single combustion cycle may be generated one time or more in at least two combustion cycles. In other words, if the cylinders are filled with the same amount of air during a predetermined period, the predetermined period may be set to two combustion cycles or less when the target air-fuel ratio is set to the inverse of an average value of a fuel-air ratio. For example, when a rich combustion cylinder exists only once during two combustion cycles under the condition that the predetermined period is two combustion cycles, the order in which a rich combustion cylinder and a lean combustion cylinder appear is expressed as, for example, “R, L, L, L, L, L, L, L”, where R represents a rich combustion cylinder and L represents a lean combustion cylinder. The period of time provided in this case is a one-combustion-cycle period shorter than the predetermined period and is expressed as “R, L, L, L,” in which some of the cylinders #1 to #4 are rich combustion cylinders, while the remaining cylinder is a lean combustion cylinder. If the target air-fuel ratio is set to the inverse of an average value of a fuel-air ratio obtained in a period differing from one combustion cycle, it is desirable that the amount of air that is temporarily drawn by the internal combustion engine in an air intake step and then returns to the intake air passage before the intake valve INV is closed can be neglected.

“Exhaust Purifying Device”

In the above embodiment, the three-way catalyst 24 serves as an exhaust purifying device. However, embodiments are not limited thereto. For example, the upstream exhaust purifying device may be the three-way catalyst 24, while the downstream exhaust purifying device may be a gasoline particulate filter (GPF). That is, the exhaust purifying device may include the three-way catalyst 24 and GPF. Alternatively, for example, the upstream exhaust purifying device and the downstream exhaust purifying device may be a first three-way catalyst and a second three-way catalyst, respectively. For example, the upstream exhaust purifying device may be a GPF, while the downstream exhaust purifying device may be a three-way catalyst. For example, the exhaust purifying device may only include a GPF. When there is no catalyst capable of storing oxygen provided upstream the GPF, it is desirable to provide a GPF capable of storing oxygen to increase the temperature rise performance by dither control.

“Temperature Rise Request of Exhaust Gas”

The temperature rise request is not limited to that exemplified in the above embodiment. For example, when the internal combustion engine 10 includes a GPF as described in the section “Exhaust purifying device,” the temperature rise request may be for increasing the temperature of the GPF to burn and remove particulate matter collected on the GPF. Alternatively, for example, a request for temperature rise of exhaust gas by dither control may be generated for increasing the temperature of the exhaust passage 22 to inhibit collection of condensed water on the exhaust passage 22.

“Controller”

The controller is not limited to one that includes the CPU 32 and the ROM 34 and performs a software process. For example, a dedicated hardware circuit (e.g. ASIC) may be provided to perform at least part of the software process performed in the above embodiment. That is, the controller may have any one of the following configurations. Configuration (a) includes a processing apparatus that performs all of the above processes in accordance with programs and a program storage device storing programs such as ROM. Configuration (b) includes a processing apparatus that performs some of the above processes in accordance with programs, a program storage device, and a dedicated hardware circuit that performs the remaining processes. Configuration (c) includes a dedicated hardware circuit that performs all of the above processes. Multiple software circuits including a processing apparatus and a program storage device and multiple dedicated hardware circuits may be provided. That is, the above processes may be performed by processing circuitry including at least one of one or more software circuits and one or more dedicated hardware circuits. The program storage device, or a computer-readable media, includes all available media that can be accessed by a general-purpose or dedicated computer.

“Internal Combustion Engine”

The internal combustion engine is not limited to a V6 type engine. For example, an in-line six-cylinder internal combustion engine or an in-line four-cylinder internal combustion engine may be employed. In this case, a single exhaust purifying device may be configured to purify exhaust gas discharged from all of the cylinders, and the number of cylinders in which exhaust gas is purified through the single exhaust purifying device is even.

“Others”

The fuel injection valve is not limited to a valve through which fuel is injected into the combustion chamber 16 and may be, for example, a valve through which fuel is injected into the air-intake passage 12. It is not essential to perform air-fuel ratio feedback control during performance of dither control.

Therefore, the present examples and embodiments are to be considered as illustrative and not restrictive and the invention is not to be limited to the details given herein, but may be modified within the scope and equivalence of the appended claims.

The invention claimed is:

1. A controller for an internal combustion engine, the internal combustion engine including an exhaust purifying device configured to purify exhaust gas discharged from a plurality of cylinders and a plurality of fuel injection valves respectively provided for the plurality of cylinders, the controller comprising processing circuitry, the processing circuitry being configured to:

perform a dither control process that operates the fuel injection valves such that at least one of the plurality of cylinders is a rich combustion cylinder having an air-fuel ratio richer than a stoichiometric air-fuel ratio and an other at least one of the plurality of cylinders is a lean combustion cylinder having an air-fuel ratio leaner than the stoichiometric air-fuel ratio, wherein the dither control process includes a first mode in which the at least one cylinder serving as the rich combustion cylinder is sequentially changed so that each of the plurality of cylinders is sequentially set as the rich combustion cylinder, and a second mode in which at least one specified cylinder in the plurality of cylinders is fixed as one of the rich combustion cylinder and the lean combustion cylinder, and wherein the processing circuitry is configured to select the first mode or the second mode based on an operating point of the internal combustion engine, perform a specified cylinder process that deviates an operation amount for controlling combustion of the at least one specified cylinder from an operation amount for controlling combustion of one of the plurality of cylinders excluding the at least one specified cylinder at a predetermined operating point of the internal combustion engine when the dither control process is performed and when the dither control process is not performed, and perform the dither control process in the second mode at the predetermined operating point.

2. The controller for an internal combustion engine according to claim 1, wherein the specified cylinder process includes a process that retards an ignition timing of the at least one specified cylinder from an ignition timing of the one of the plurality of cylinders excluding the at least one specified cylinder, and the processing circuitry is configured to fix the at least one specified cylinder as the rich combustion cylinder in the second mode.

3. The controller for an internal combustion engine according to claim 1, wherein the processing circuitry is configured to perform, in the first mode, a gradual change process that gradually reduces an enrichment degree of a first cylinder serving as the rich combustion cylinder and a lean degree of a second cylinder serving as the lean combustion cylinder at a first reduction rate to change the first cylinder into the lean combustion cylinder and the second cylinder into the rich combustion cylinder and thereafter gradually increases an enrichment degree of the second cylinder and a lean degree of the first cylinder, and the gradual change process includes a process that reduces the enrichment degree of the rich combustion cylinder and the lean degree of the lean combustion cylinder at a second reduction rate that is greater than the first reduction rate when the dither control process transitions from the first mode to the second mode.

4. A method for controlling an internal combustion engine, the internal combustion engine including an exhaust purifying device configured to purify exhaust gas discharged from a plurality of cylinders and a plurality of fuel injection valves respectively provided for the plurality of cylinders, the method comprising:

performing a dither control process that operates the fuel injection valves such that at least one of the plurality of cylinders is a rich combustion cylinder having an air-fuel ratio richer than a stoichiometric air-fuel ratio and an other at least one of the plurality of cylinders is a lean combustion cylinder having an air-fuel ratio leaner than the stoichiometric air-fuel ratio, wherein the dither control process includes a first mode in which the at least one cylinder serving as the rich combustion cylinder is sequentially changed so that each of the plurality of cylinders is sequentially set as the rich combustion cylinder, and a second mode in which at least one specified cylinder in the plurality of cylinders is fixed as one of the rich combustion cylinder and the lean combustion cylinder, and the method further comprises selecting the first mode or the second mode based on an operating point of the internal combustion engine, performing a specified cylinder process that deviates an operation amount for controlling combustion of the at least one specified cylinder from an operation amount for controlling combustion of one of the plurality of cylinders excluding the at least one specified cylinder at a predetermined operating point of the internal combustion engine when the dither control process is performed and when the dither control process is not performed, and performing the dither control process in the second mode at the predetermined operating point.

* * * * *